(12) United States Patent
McPherson et al.

(10) Patent No.: US 9,404,588 B2
(45) Date of Patent: Aug. 2, 2016

(54) VACUUM CONTROL VALVE FOR VACUUM DRAINAGE SYSTEM

(75) Inventors: Douglas R. McPherson, East Granby, CT (US); George C. Mendrala, Pittsfield, MA (US); James Ronning, Tacoma, WA (US); Jay A. Shands, Belchertown, MA (US)

(73) Assignee: Paperchine, Inc., Rockton, IL (US)

( * ) Notice: Subject to any disclaimer, the term of this patent is extended or adjusted under 35 U.S.C. 154(b) by 531 days.

(21) Appl. No.: 13/643,400

(22) PCT Filed: Apr. 29, 2011

(86) PCT No.: PCT/US2011/034448
§ 371 (c)(1),
(2), (4) Date: Nov. 27, 2013

(87) PCT Pub. No.: WO2011/137287
PCT Pub. Date: Nov. 3, 2011

(65) Prior Publication Data
US 2014/0183390 A1 Jul. 3, 2014

Related U.S. Application Data

(60) Provisional application No. 61/329,783, filed on Apr. 30, 2010.

(51) Int. Cl.
*F16K 3/34* (2006.01)
*F16K 3/16* (2006.01)
(Continued)

(52) U.S. Cl.
CPC ... *F16K 3/16* (2013.01); *F16K 3/34* (2013.01); *F16K 5/12* (2013.01); *F16K 51/02* (2013.01)

(58) Field of Classification Search
USPC .......... 251/208, 209; 162/363; 406/129, 183, 406/192
See application file for complete search history.

(56) References Cited

U.S. PATENT DOCUMENTS 2,995,359 A * 8/1961 Gulick ..................... 271/103
3,355,220 A * 11/1967 Brown ..................... 406/192
(Continued)

FOREIGN PATENT DOCUMENTS

EP 1744086 A1 1/2007
WO 01/03162 A1 1/2001

OTHER PUBLICATIONS

International Search Report and Written Opinion dated Jul. 26, 2011 for International Application Serial No. PCT/US2011/034448, International Filing Date: Apr. 29, 2011 consisting of 11 pages.

*Primary Examiner* — John Fox
(74) *Attorney, Agent, or Firm* — Christopher & Weisberg, P.A.

(57) ABSTRACT

A valve for a vacuum drainage system includes a valve body having an interior chamber operatively connectable to a suction device and through an outlet to a vacuum source. A movable member having an aperture is secured within the chamber and movable through points between closed and open positions to adjust the open area of the aperture and the fluid flow through the outlet. The aperture is configured such that during adjustment to increase the effective operational area of the aperture, a rate of change of the effective operational area increases non-linearly in relation to a linear increase in the distance of travel, while providing advantageous and more controllable linear adjustment of the applied vacuum. The aperture can have a trilateral shape including at least one curved side, or comprise a plurality of sub-apertures, and the movable member can comprise a rotary sleeve.

19 Claims, 14 Drawing Sheets

(51) Int. Cl.
*F16K 5/12* (2006.01)
*F16K 51/02* (2006.01)

(56) References Cited

U.S. PATENT DOCUMENTS

| | | | | |
|---|---|---|---|---|
| 3,409,270 A | * | 11/1968 | Hulsey | 251/209 |
| 3,557,821 A | * | 1/1971 | Siegel et al. | 137/269.5 |
| 3,896,194 A | * | 7/1975 | Martin | 261/41.5 |
| 3,998,227 A | * | 12/1976 | Holbrook et al. | 604/119 |
| 4,918,768 A | * | 4/1990 | DeSousa et al. | 4/541.5 |
| 4,989,833 A | * | 2/1991 | Polon | F16K 5/0605 137/1 |
| 5,174,320 A | * | 12/1992 | Allen | 137/1 |
| 5,338,166 A | * | 8/1994 | Schultz | 417/442 |
| 5,489,365 A | * | 2/1996 | Wahlstrom | D21F 9/006 162/203 |
| 5,570,870 A | * | 11/1996 | Bilgery | 251/208 |
| 6,076,872 A | * | 6/2000 | Harter | 294/186 |
| 6,109,591 A | | 8/2000 | Tuttle et al. | |
| 6,752,909 B2 | * | 6/2004 | Halmschlager | D21F 1/483 162/351 |
| 7,455,076 B2 | * | 11/2008 | Kwon et al. | 137/630.12 |
| 8,443,765 B2 | * | 5/2013 | Hollis | 123/41.08 |
| 8,734,736 B2 | * | 5/2014 | Ludwig | 422/544 |
| 2004/0118464 A1 | * | 6/2004 | Chang et al. | 137/630 |

* cited by examiner

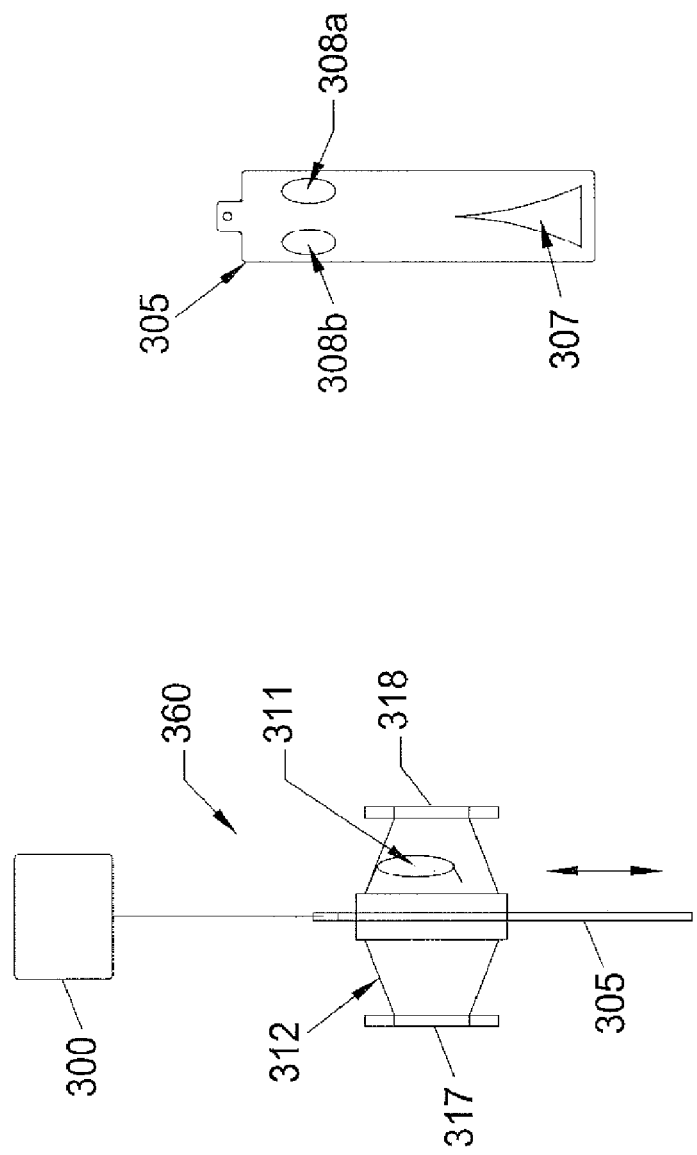

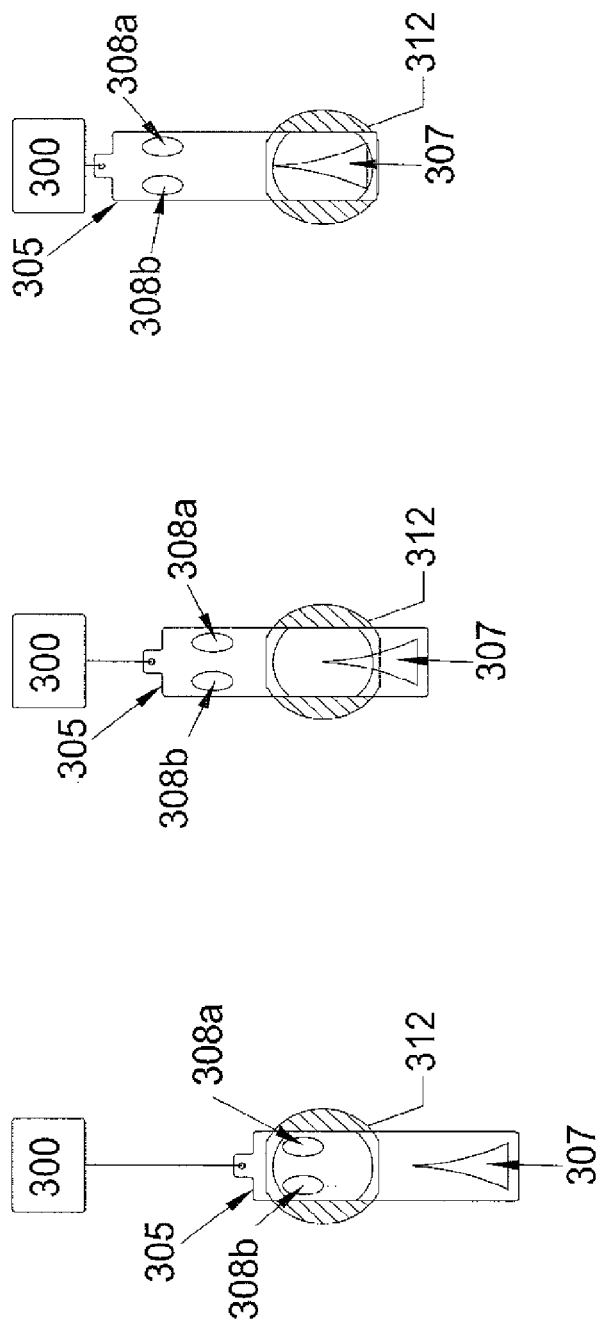

VACUUM CONTROL VALVE FOR VACUUM DRAINAGE SYSTEM

This application is related to and claims priority to International Application Number: PCT/US2011/034448, filed Apr. 29, 2011, entitled "VACUUM CONTROL VALVE FOR VACUUM DRAINAGE SYSTEM," which claims priority to Application Ser. No. 61/329,783, filed Apr. 30, 2010, the entirety of both of which are incorporated herein by reference.

FIELD OF THE INVENTION

The invention relates to vacuum valves used to control the amount of negative pressure applied to a suction device in filtration operations, and particularly in papermaking machines. The invention particularly concerns a vacuum control valve that includes an adjustable aperture, such that the rate of change of its open area increases non-linearly in relation to the adjustment, while providing substantially linearly variable vacuum pressure.

BACKGROUND OF THE INVENTION

As used herein, the terms "vacuum", "suction" and "negative pressure" have equivalent meanings and refer to an amount of air pressure developed in a confined space (e.g. piping, suction chamber, etc.) that is lower than ambient atmospheric air pressure.

As noted above, the invention is applicable to various types of filtration operation, but is particularly suitable for filtration in papermaking processes. Although the invention is described below primarily in relation to papermaking processes, it should be understood that the principles of the invention are not limited thereto, and can be applied to other filtration processes having similar requirements to papermaking processes.

In modern papermaking processes, a very dilute slurry comprising about 1% papermaking solids in about 99% water (referred to as the "stock") is jetted at high speed and precision from a headbox onto an endless rotating belt called a forming fabric. The stock jet is aimed so that it lands on the forming fabric as the fabric passes in sliding contact over a forming element. Water from the stock drains through the forming fabric, leaving behind an embryonic mat of papermaking fibers and solids. The forming fabric and mat thereon pass over one or more drainage, agitation and suction devices which serve to both drain water and randomize the fiber distribution so as to provide a fibrous web. This web is transferred at the end of the forming section to a downstream press section where a further portion of the water is removed by mechanical means; the wet sheet is subsequently transferred to a dryer section of the papermaking machine where the remainder of the water in the web is removed by evaporative means.

Controlled sources of vacuum are used in the forming and press sections of the papermaking machine to assist in removal of water from the web and to help control agitation of the stock. Due to the highly fluid nature of the stock in the forming section, precise control of the vacuum pressure applied to the forming fabric and embryonic web through the drainage and agitation devices is very important to the properties of the finished sheet. Other factors which raise the requirement for precise control in the press section of the papermaking machine are noted below.

There are two general categories of suction assisted drainage devices presently used in papermaking processes: a) so-called low vacuum units, which supply from 0 to 60" (0 to 1500 mm) of water vacuum to the forming fabric and web, and b) high vacuum units, which supply a higher vacuum level to the fabrics and web than low vacuum units. It has been found that valves presently in use in both of these types of suction assisted drainage devices do not provide acceptably consistent vacuum control outside the middle portion of their operating ranges.

Conventionally, vacuum control to these devices has been accomplished using a wide variety of standard and specialized valves of differing size, all of which are intended to control either low or high vacuum air flow. These valves typically provide reasonably good flow control at the middle range of their openings, but as they initially open, or as they approach their maximum opening, there is little, if any, control available. In relatively lower vacuum applications used in papermaking processes, there is a high pressure drop across the valve and a relatively low flow rate, whereas in relatively higher vacuum applications, the pressure drop across the valve is very small and the flow rates are high. In general operation, to avoid the problems noted above, it has been preferred to use a control valve that operates in the middle portion of its stroke (40 to 60% open) to achieve accurate vacuum control. This then requires a wide range of valve sizes and an accurate estimate of the operating condition of the drainage elements, which conditions may change with time and paper grade being manufactured.

The problem of reliably controlling the vacuum pressure applied to the forming fabric in particular is further complicated as a mat of papermaking fibers is built up during the sheet formation process. The amount of fiber and fillers present on a forming fabric during the papermaking process will be dependent on the paper grade being manufactured. Relatively "heavier" grades (i.e., products having relatively higher basis weights), such as linerboard or cardboard, will comprise greater amounts of fiber than comparatively "lighter" paper grades (i.e., those having comparatively lower basis weights), such as newsprint or towel, or fine papers. The heavier paper grades will form a thicker mat, which will provide greater resistance to air flow in comparison to a mat formed for a lighter grade application. This phenomenon is referred to as "filtration resistance" and is well known in the papermaking arts (see e.g. Wildfong et al. *"Filtration Mechanics of Sheet Forming. Part 1: Apparatus for Determination of Constant-Pressure Filtration Resistance"*. J. Pulp Paper Sci., Vol. 26, No. 7 (July 2000), pp. 250-254). As the filtration resistance of the mat increases, the amount of applied vacuum must be adjusted correspondingly to maintain adequate drainage of the sheet. Precise linear regulation of applied vacuum to the forming fabrics has been difficult to accomplish using the vacuum control valves presently available, because of this variation of the filtration resistance of the mat of papermaking fibers, based on the grade of paper product being manufactured. This problem is further exacerbated by the variety of pipe sizes used in vacuum control systems for papermaking processes. It is not uncommon to find in such systems various valves of differing sizes and designs; given these complications, adequate vacuum control during papermaking processes has been difficult to achieve.

The present invention therefore addresses the problem of valve size and design selection for use in connection with a suction assisted drainage device, and is particularly directed at the unique operating conditions and environments in which these vacuum devices are located in papermaking processes. The present invention is particularly concerned with a valve apparatus which is used to control the amount of vacuum applied to the suction assisted drainage elements so that the applied vacuum varies linearly as the valve is opened or closed in response to adjustment from a very low to a very high level of vacuum pressure. The valve is designed to provide a non-linear continuously increasing rate of change in open area which provides a linear vacuum response that is directly proportional to the valve aperture position over up to at least about 90% of its operating range. The unique configuration of the valve aperture, or open area, of the valves of the invention, allows for a linear change in the fluid flow rate (vacuum) in response to gradual linear adjustments of the valve from fully closed to fully open. This allows a single valve to be used for both high and low flow environments with more effective control of vacuum under both conditions. With a single valve for all positions in a papermaking vacuum system, changes in operating conditions do not require a change in valve size, thus significantly reducing the cost of spares. The valves of the invention provide a relatively linear change in the amount of vacuum pressure applied to the papermaking process in response to their adjustment; depending on the vacuum range being controlled, this change is directly proportional to the amount of open area provided to the vacuum source as the valve is opened or closed.

The single valves of the invention can be provided as rotary sleeve type valves, in which the flow rate is regulated by adjusting the operational area of an aperture in the rotary sleeve presented to a valve body outlet, or can be provided as other types of movable valve, for example by providing the aperture in a movable member such that the operational area presented to the valve body outlet is adjusted by moving the member in a selected direction in relation to that outlet.

SUMMARY OF THE INVENTION

As noted above, it has been found that many of the problems of known vacuum valves can be addressed and overcome by providing a valve in which the valve aperture is configured such that in response to linear adjustment in the movable member of the valve to increase the open area, the rate of change of open area increases in a non-linear manner, but provides a linear change in the flow rate through the aperture.

The vacuum control aperture is shaped so as to provide a smooth, linear vacuum response to the amount of open area presented to the vacuum source and the amount of vacuum applied to the suction box through the valve. It has further been found to be particularly advantageous if the vacuum control aperture is shaped such that the rate of change in the amount of open area of the vacuum control opening presented to the vacuum drainage system to which it is connected at any point of the movement of the movable member, for example by rotation of a valve sleeve from fully closed to fully open, is determinable by a polynomial equation of at least the second degree. This configuration provides for a relatively slow increase in open area in the initial adjustment from a fully closed position to a partly open position, and at the same time a rapid increase in the open area as the adjustment brings the valve near to the fully open position.

To provide this rate of change, and as discussed further below and in particular in relation to the drawings, it has further been found particularly advantageous to provide a configuration of the opening which is substantially trilateral, and in particular having two linear sides, and a third curved side presenting an outward facing concave aspect and having a curvature determinable by a polynomial equation of at least the third degree, such that the rate of change in the open area provided by the increasingly exposed aperture will be determinable by a polynomial equation of at least the second degree.

It has also been found to be particularly advantageous to provide such trilateral aperture for which the curvature of the third side is determinable by a polynomial equation of at least the fourth degree; and it may be even more advantageous if the rate of change in the open area is determinable by a polynomial equation of the fourth degree.

The invention therefore seeks to provide a valve for use in a vacuum drainage system, comprising
i) a valve body having
  (a) an exterior wall comprising an inlet operatively connectable to an output from a suction device, an outlet operatively connectable to a vacuum source, and
  (b) an interior chamber;
(ii) a movable member movably secured within the interior chamber and comprising at least one movable member outlet aperture to selectively provide an operational open area constructed and arranged to allow fluid flow therethrough, and
  (a) being located to cooperate with the valve body outlet, such that movement of the movable member through a distance of travel through selected ones of a plurality of positions between a fully closed aperture position and a fully open aperture position presents at least a portion of the at least one aperture to the valve body outlet, to adjust the effective operational open area of the aperture presented to the valve body outlet and in operation to regulate a corresponding rate of flow through the at least one aperture and the valve body outlet; and
  (b) having a configuration such that during movement of the movable member to increase the effective operational area of the at least one aperture, a rate of change of the effective operational area increases non-linearly in relation to a linear increase in the distance of travel.

Preferably, the at least one aperture has a configuration such that during movement of the movable member in operation, a linear increase in the distance of travel provides a substantially linear increase in fluid flow through the effective operational area of the at least one aperture.

In one aspect, the interior chamber comprises a substantially cylindrical interior, the movable member is a rotatable sleeve secured within the substantially cylindrical interior and having a substantially cylindrical outer wall, the outlet aperture is provided to the substantially cylindrical outer wall, and the movement of the sleeve through the distance of travel comprises rotation about an axis.

Alternatively, the movable member is a slidable plate member.

Preferably, the rate of change of the effective operational area increases according to an equation including at least one exponential factor, and more preferably according to a polynomial equation of at least a second degree.

Optionally, the polynomial equation is of a third degree or of a fourth degree. In one aspect, the polynomial equation is $y=ax^4+bx^3+cx^2+dx+e$, where
  y is the rate of change of the effective operational open area, and
  x is the distance of travel of the movable member, expressed as a decimal ranging from a fully closed aperture position at 0.0, to a fully open aperture position at 1.0. In some embodiments, preferably the polynomial equation is $y=ax^4+bx^3+cx^2+dx+e$, with the constants having the following values: $a=0.00008\pm10\%$; $b=-0.0013\pm10\%$; $c=0.0027\pm10\%$; $d=-0.0052\pm10\%$; and $e=-0.0009\pm10\%$.

In one aspect of the invention, the valve comprises a single aperture. Preferably, such single aperture has a configuration which is substantially trilateral, and more preferably includes at least one curved side. In this aspect, preferably the aperture configuration is defined by substantially linear first and second edges and a third edge connected to and having a curvature towards each of the first and second edges, and in this aspect preferably the first edge is substantially parallel to the axis and the second edge is substantially perpendicular to the first edge; more preferably the first edge and the second edge are of substantially equal length. Preferably, the curvature is selected from partial parabolic, arcuate, and a curve defined by a plurality of mutually connected linear segments.

In one aspect, the curvature is defined according to an equation including at least one exponential factor, preferably according to a polynomial equation of at least a third degree, more preferably of a fourth degree. In this aspect, preferably the polynomial equation is $y=fx^4+gx^3+hx^2+jx+k$, where y is the curvature, and x is the distance of travel of the movable member, expressed as a decimal ranging from a fully closed aperture position at 0.0, to a fully open aperture position at 1.0. In some embodiments, preferably the polynomial equation is $y=fx^4+gx^3+hx^2+jx+k$, with the constants having the following values: f=1.18; g=−0.39; h=−0.16; j=0.37; and k=0.

In an alternative aspect of the invention, the aperture configuration comprises a plurality of wall connection members defining a plurality of sub-apertures, preferably having a configuration selected from at least one of slots and perforations.

In some embodiments, the exterior wall of the valve body further comprises a vent operatively connectable to a source of ambient atmospheric air; and the movable member further comprises a movable member inlet operably alignable with the vent. Preferably such movable member inlet has a quadrilateral configuration, and where the movable member is a rotatable sleeve, preferably the movable member inlet has a trapezoidal configuration, wherein two parallel sides are oriented substantially parallel to the direction of rotation of the movable member.

BRIEF DESCRIPTION OF THE DRAWINGS

The invention will be more fully described by way of reference to the appended Figures in which:

FIG. 10 shows a valve in a third embodiment of the invention;

FIG. 11 shows the sliding member in the embodiment of FIG. 10;

FIG. 12 shows progressive steps in the adjustment of the valve in the embodiment of FIG. 10;

DETAILED DESCRIPTION OF THE DRAWINGS

Figure 1:
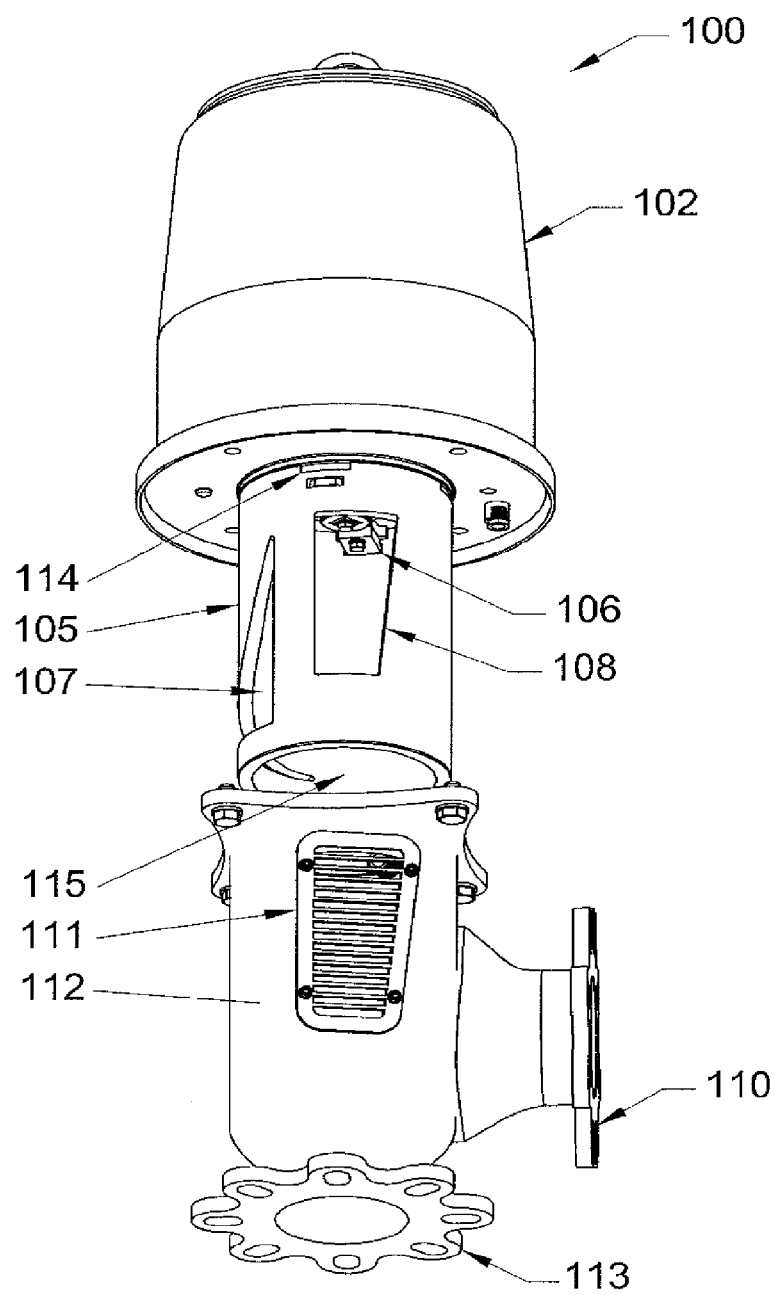
FIG. 1 is an exploded view of a valve according to a first embodiment of the present invention.
Figure 2:
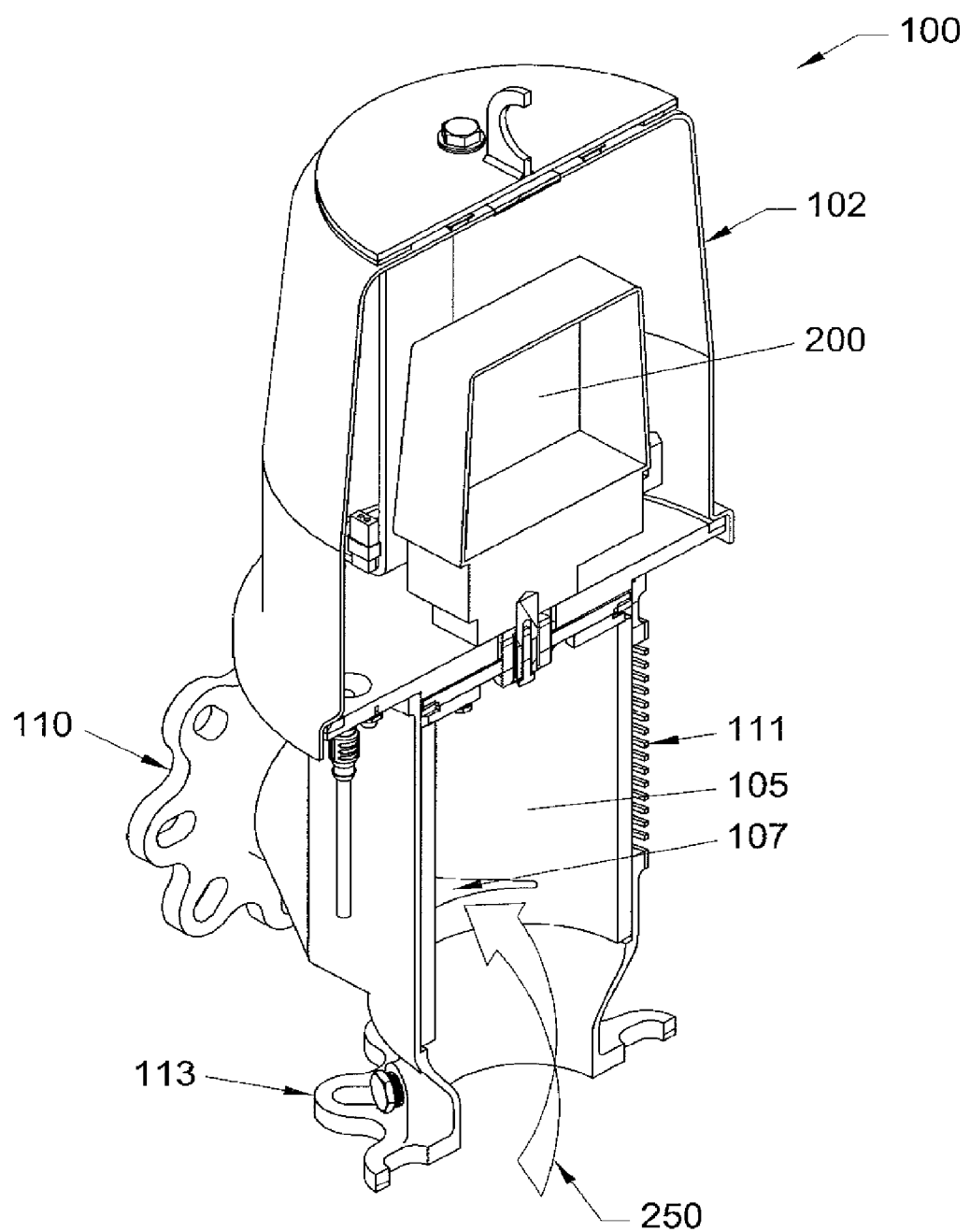
FIG. 2 is a schematic illustration of the assembled valve shown in FIG. 1 indicating direction of fluid flow through the valve and the valve body outlet to the vacuum source.
Figure 3:
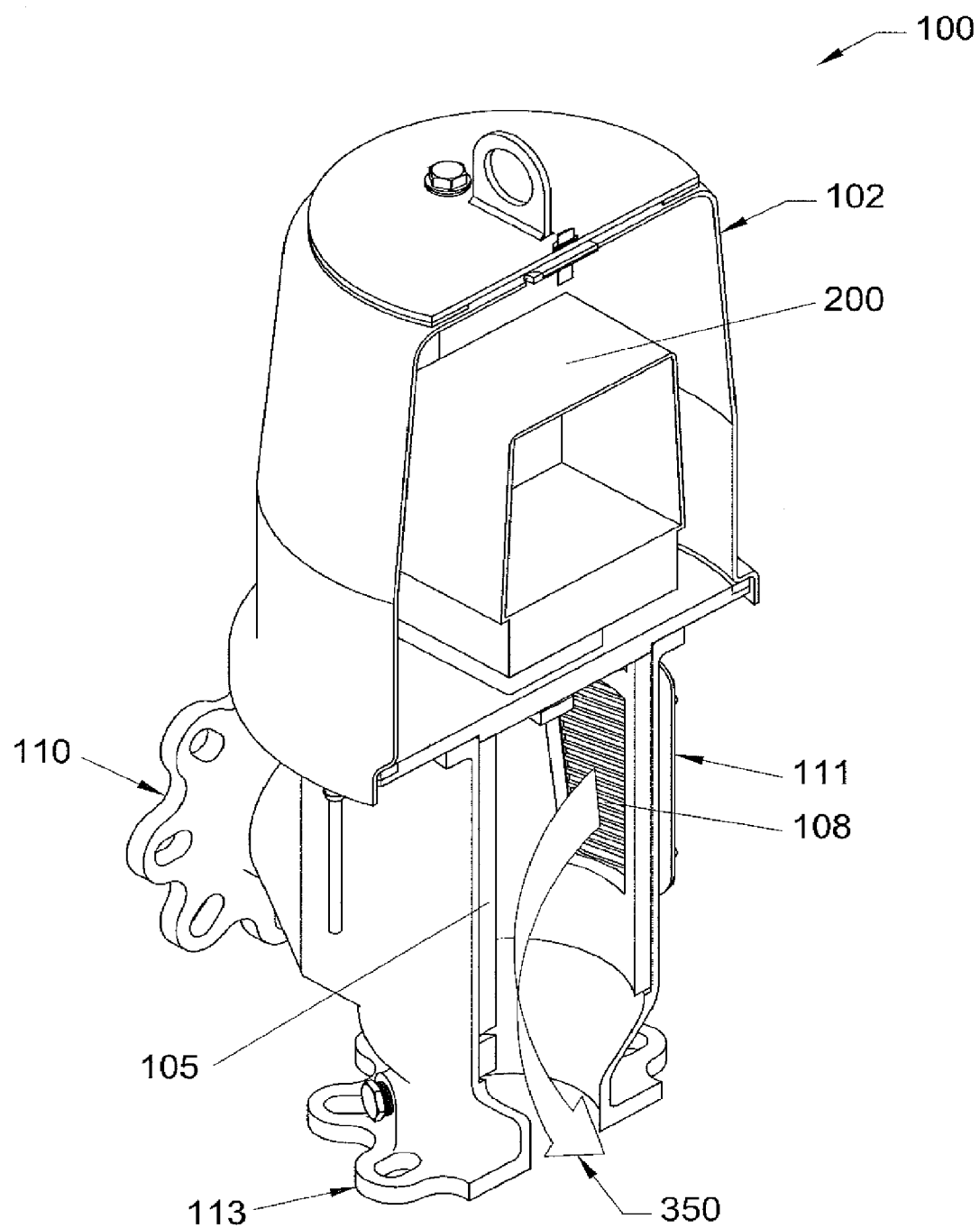
FIG. 3 is a schematic illustration of the assembled valve shown in FIG. 1 showing the direction of air flow from the valve body inlet to the suction device.

FIGS. 1 to 3 show respectively an exploded view of a valve according to an embodiment of the invention, and two partial cut-away views of the valve in an operational position. As shown in FIGS. 1 to 3, valve 100 comprises a valve body 112, with an outlet flange 110 for connection to a vacuum source (not shown) and an inlet flange 113 for connection to the appropriate location in the equipment (not shown) in a papermaking process. Optional vent 111 provides access for ambient atmospheric air. The valves of the invention can be provided without such vents, depending on the intended end use, or if provided, the vent may be selectively blocked or otherwise stopped to prevent or restrict access of ambient air. Valve sleeve 105 is operationally secured to actuator 200 (see FIG. 2), protectively located beneath valve cover 102, by drive flange 106, so that when valve cover 102 is secured over valve body 112, valve sleeve 105 is selectively rotatable within valve body 112, the rotation being controlled by actuator 200. The wall of sleeve 105 is provided with an outlet aperture 107, which is configured according to the invention, and located so as to be operationally brought into and out of alignment with the outlet at flange 110 and thereby connection with the vacuum source, allowing for a flow path in the direction of arrow 250 (FIG. 2). Where vent 111 is provided, the wall of valve sleeve 105 can correspondingly be provided with an inlet aperture 108, configured and located so as to be operationally brought into and out of alignment with vent 111, on rotation of valve sleeve 105, to selectively allow or restrict the passage of ambient air through vent 111 into valve sleeve 105, through a flow path in the direction of arrow 350 (FIG. 3).

Figure 4A:
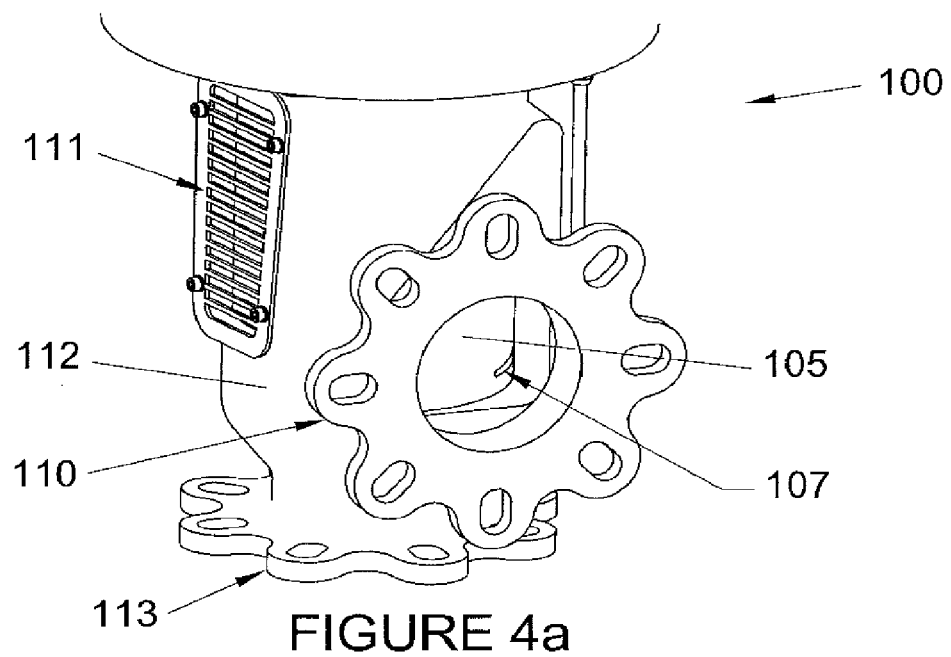
FIGS. 4a to 4d show the progression of the valve body outlet opening as the valve sleeve is rotated by the actuator within the valve body, with FIG. 4a showing the initial opening and FIG. 4d showing the valve in near fully opened position.
Figure 4B:
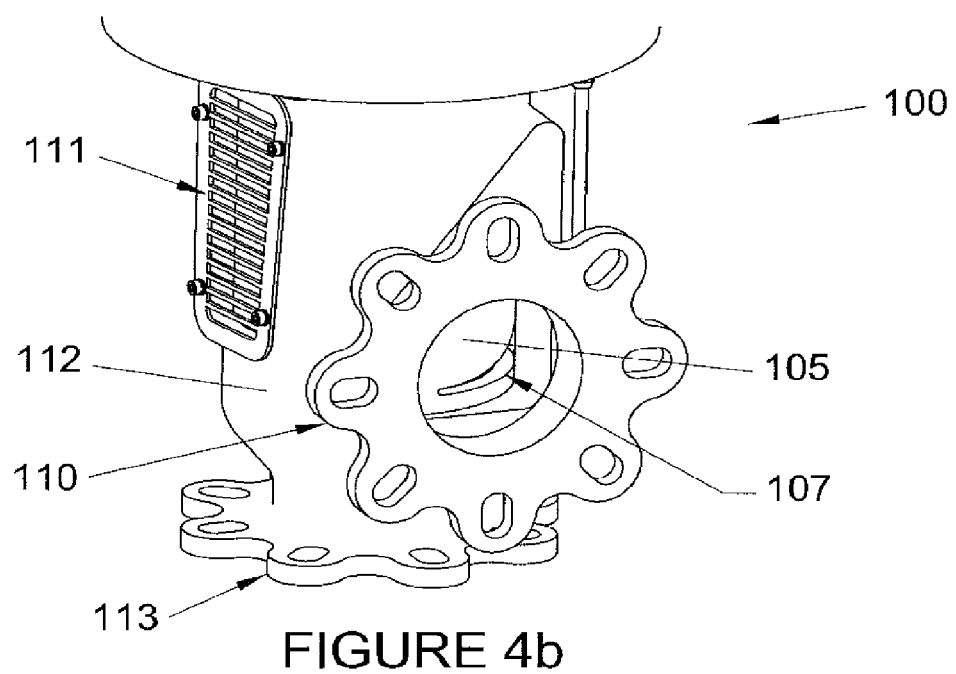
Figure 4C:
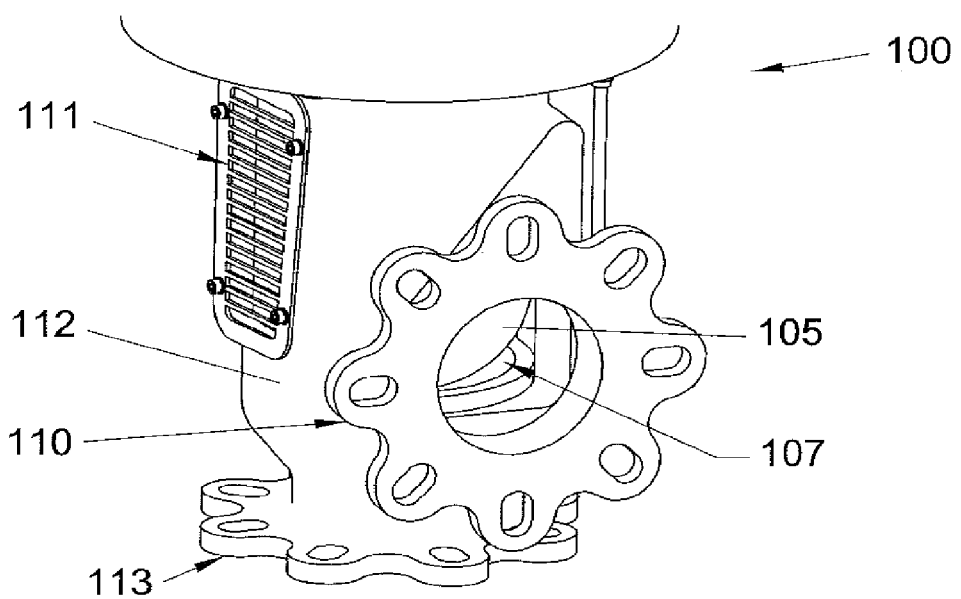
Figure 4D:
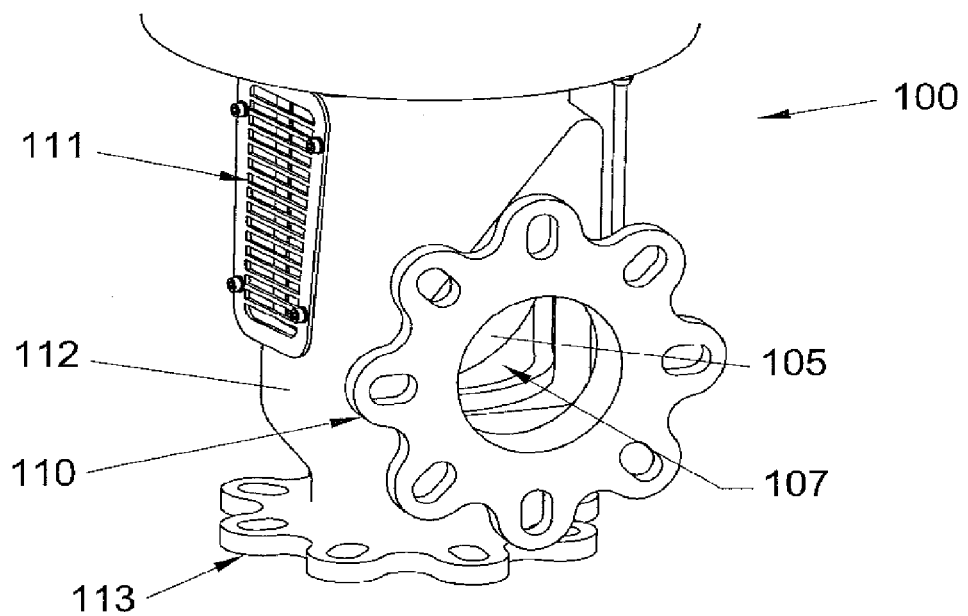

Referring to FIGS. 4a to 4d, these figures show the progressive opening of valve sleeve outlet aperture 107 within valve body 112, as valve sleeve 105 is rotated to cause outlet aperture 107 to move from a closed position in FIG. 4a to a fully open position in FIG. 4d. Where vent 111 is provided, the locations of inlet aperture 108 and outlet aperture 107 in the wall of valve sleeve 105 are spaced apart such that on rotation of valve sleeve 105 to close inlet aperture 108 and close the ambient air intake, and open outlet aperture 107 to connect to the vacuum source, inlet aperture 108 is preferably completely closed before the opening of outlet aperture 107 commences. However, under certain circumstances where specific operational conditions must be satisfied, if desired the outlet aperture 107 and the inlet aperture 108 can be located on valve sleeve 105 such that both can be simultaneously, to a minor degree, open to flow.

Figure 5:
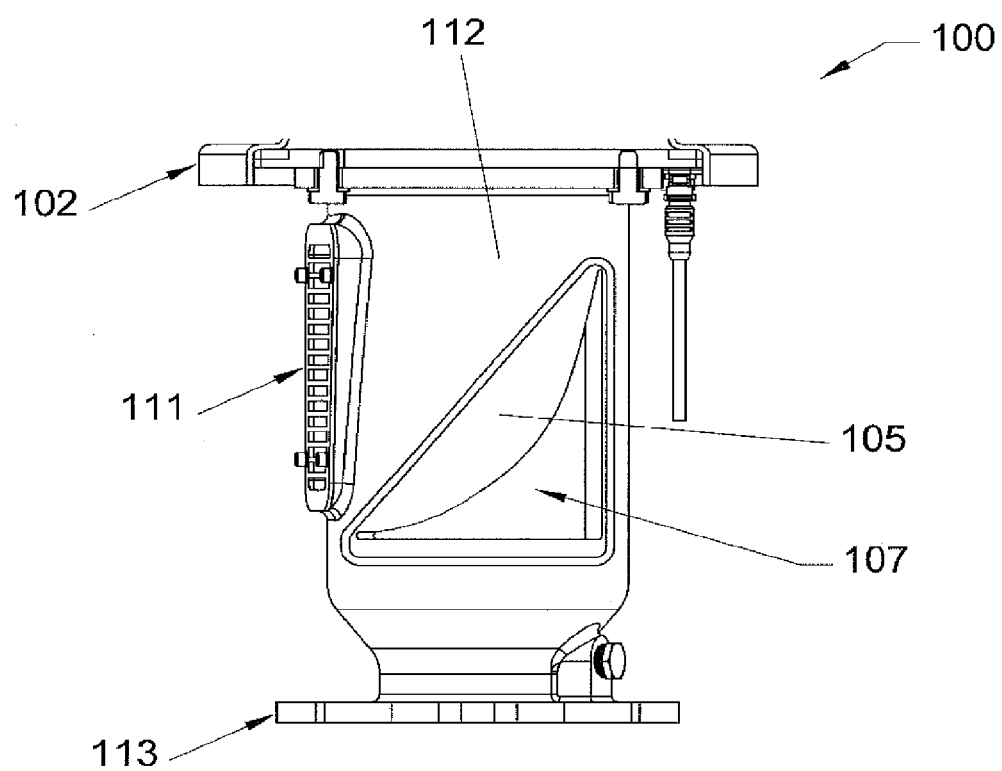
FIG. 5 shows the valve body outlet in fully opened position with the attachment means to further piping removed.

FIG. 5 shows valve 100 with flange 110 removed so that outlet aperture 107 is visible in the fully open position, similar to the position in FIG. 4d.

Figure 6:
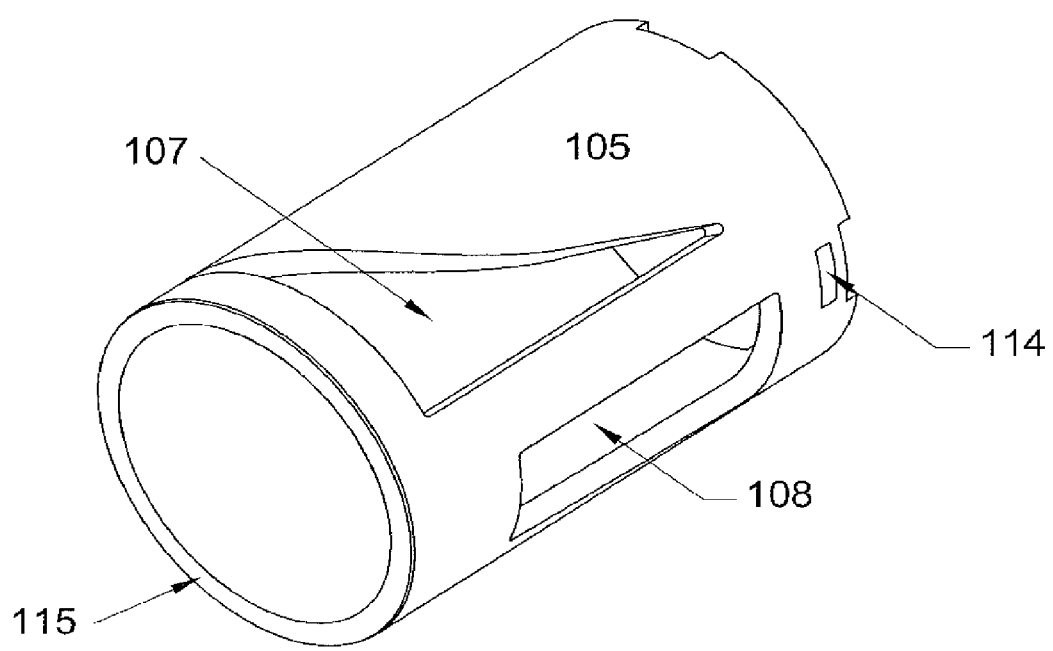
FIG. 6 is a diagram showing the valve sleeve intended for use in the valve shown in FIGS. 1 to 5 including the inlet and outlet apertures.

FIG. 6 shows valve sleeve 105 including outlet aperture 107 and inlet aperture 108. When fully assembled, valve bottom 115 would be located above and proximate to flange 113. Opening 114 provides for operational connection of actuator 200 (FIG. 2) to sleeve 105 via drive flange 106 (FIG. 1) to allow transmission of rotational force.

Figure 7:
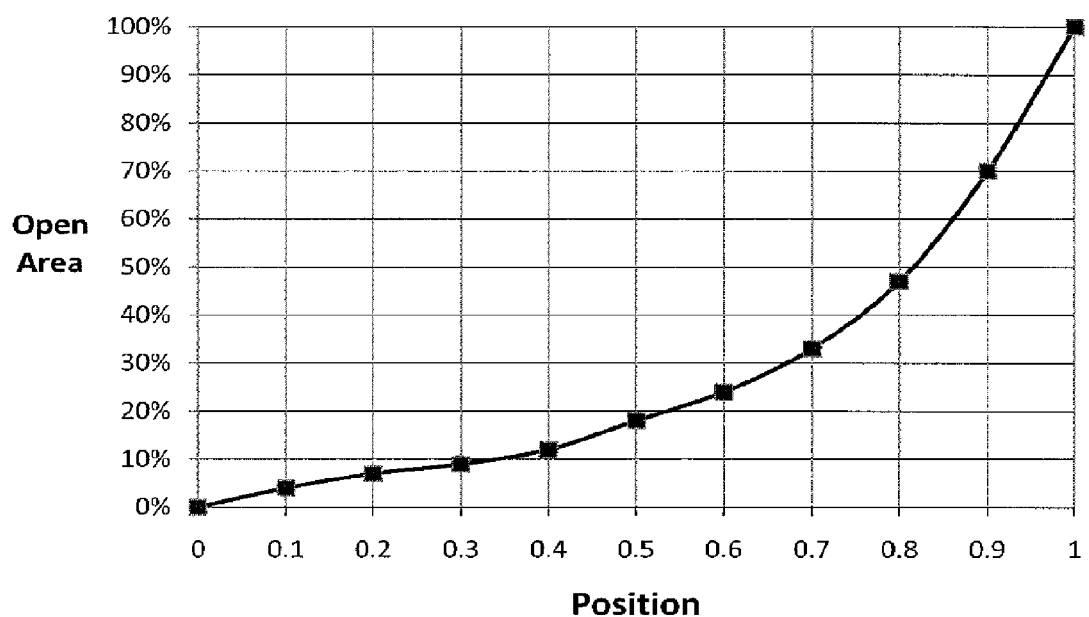
FIG. 7 is a graph showing the percentage open area of a valve aperture according to a first embodiment of the invention, as a function of the valve sleeve position.

FIG. 7 is a graph showing the amount of open area of the valve outlet aperture 107 in an embodiment of the invention, as a function of its rotation from fully closed to fully open. The curve shows the amount of open area of the valve sleeve outlet aperture 107 that must be exposed to vacuum pressure in order to provide a substantially linear response in applied vacuum as a function of valve sleeve rotation and the increasing rate of change in open area. Inspection of the graph of FIG. 7 shows that, as the valve sleeve 105 is rotated so that its position changes from fully closed at position (0) to fully open at position (1), the open area of the valve outlet aperture, expressed as a percentage of the total available aperture area, changes from 0 to 100% along the curve. It has been found that this change in the open area of the valve outlet aperture will provide the appropriate rate of change in the open area of the valve outlet aperture to supply a substantially linear response in the vacuum pressure applied to the vacuum drainage system as a function of sleeve rotation. This information is summarized in Table 1 below.

TABLE 1

Open Area of Valve Inlet Aperture as Function of Valve Rotation/Position

| Valve Rotation Position | Open Area (%) |
|---|---|
| 0.0 | 0 |
| 0.1 | 0.7 |
| 0.2 | 3 |
| 0.3 | 6 |
| 0.4 | 10 |
| 0.5 | 16 |
| 0.6 | 24 |
| 0.7 | 34 |
| 0.8 | 48 |
| 0.9 | 69 |
| 1.0 | 100 |

As shown in Table 1, 0% rotation (Valve Rotation Position 0.0) provides zero open area of the valve outlet aperture 107. At 10% valve rotation (valve position at 0.1), the open area of the valve outlet aperture is 0.7%, and at 20% rotation, the valve aperture presents 3% open area to the vacuum drainage system, and at 30% rotation the valve aperture presents 6% open area, thus conforming to the desirability of a relatively slow increase in open area in the first stages of movement from the closed position. In contrast, at 70%, 80%, 90% rotation, the valve aperture presents respectively 34%, 48%, 69% open area to the vacuum drainage system, providing the desirable sharp increase in open area in the positions approaching the fully open (100%) position.

This corresponds to an increasing rate of change in open area, as the aperture moves from the closed position towards the fully open position. As noted above, this increasing rate of change is preferably determinable by a polynomial equation of at least the second degree. More particularly preferred features, including suitable polynomial equations and numeric values, are discussed above.

It has further been found through experiments that valves comprising rotatable sleeves and having apertures with open areas which vary in the general manner indicated in Table 1 can provide a generally linearly varying vacuum pressure to the vacuum drainage system to which they are connected, as a function of the rotation of valve sleeve 105. As noted above, during the papermaking process, a mat of fibers is formed on the forming fabric, and this mat is dewatered in part by the suction force applied to the underside of the fabric by the vacuum dewatering units. When the paper product formed on the mat provides a high filtration resistance (i.e., the resistance to the passage of air through the mat due to applied suction is relatively high, e.g. when the sheet is very wet) then the ratio of the open area of the valve $A_{valve}$ to the open area of the vacuum drainage system piping $A_{pipe}$ is preferably low when the valve is first opened, so as to provide the desired linear vacuum response as the valve is opened. Conversely, when the paper product has a low mat resistance (e.g. when free water disappears from the mat), it is preferable that the ratio $A_{valve}/A_{pipe}$ increase more rapidly than for the higher resistant mat when the valve is first opened. Similar benefits are also seen for heavy weight as compared with lightweight grades. It has been found that a suitable compromise can be achieved between the differing requirements for different stages of the process, by selecting a configuration for the aperture which provides a relatively slow increase in open area at the earliest stages, i.e. the initial opening of the valve from the closed position, a steady increase in open area in the intermediate stages, and a significantly more rapid increase in the later stages towards the fully open position, which in turn allows for a linear vacuum response as a function of opening from fully closed to fully open. This compromise is achieved by the selection of the appropriate rate of change of aperture open area, for example according to a preferred polynomial equation as discussed above; and thereby the selection of the appropriate shape for the aperture, and in the case of a trilateral aperture having one curved side, the selection of the appropriate equation for the curve.

The outlet aperture 107 shown in FIG. 6 has been found to be an effective shape for use in embodiments of the present invention having rotary sleeve valves. In a specific instance, a valve according to the invention was made, the sleeve 105 being formed from a continuous PTFE (polytrifluoroethylene, or Teflon®) tube with an outside diameter of 7.0 inches (17.78 cm), an inside diameter of 5.5 inches (13.97 cm), and a height of 9.875 inches (25.083 cm). As shown in FIG. 6, the trilateral outlet aperture provided in the tube had two substantially equal straight sides, one parallel and the other perpendicular to the axis of rotation of the sleeve; each straight side was 6.6 inches (16.764 cm) in length and these two sides were connected to each other by a curve to form a trilateral opening having an open area which increased according to the invention, i.e. with an increasing rate of change as the aperture moved from the closed position towards the open position. The sleeve 105 was provided with an inlet aperture 108; this aperture is trapezoidal in shape having an overall length of 5.75 inches (14.61 cm), one end being 1.938 inches (4.92 cm) wide, the other being 2.50 inches (6.35 cm) wide. The valve sleeve 105 was installed in a valve body 112 as part of valve 100 substantially as shown in FIGS. 1 to 3 and vacuum applied through piping attached to flange 110 which passed through valve 100 to a papermaking process via further piping attached to flange connection 113. Rotation of valve sleeve 105 via drive assembly 200 produced a variance in vacuum pressure applied to the papermaking process that was substantially linear in accordance with the objectives of the invention.

Figure 8:
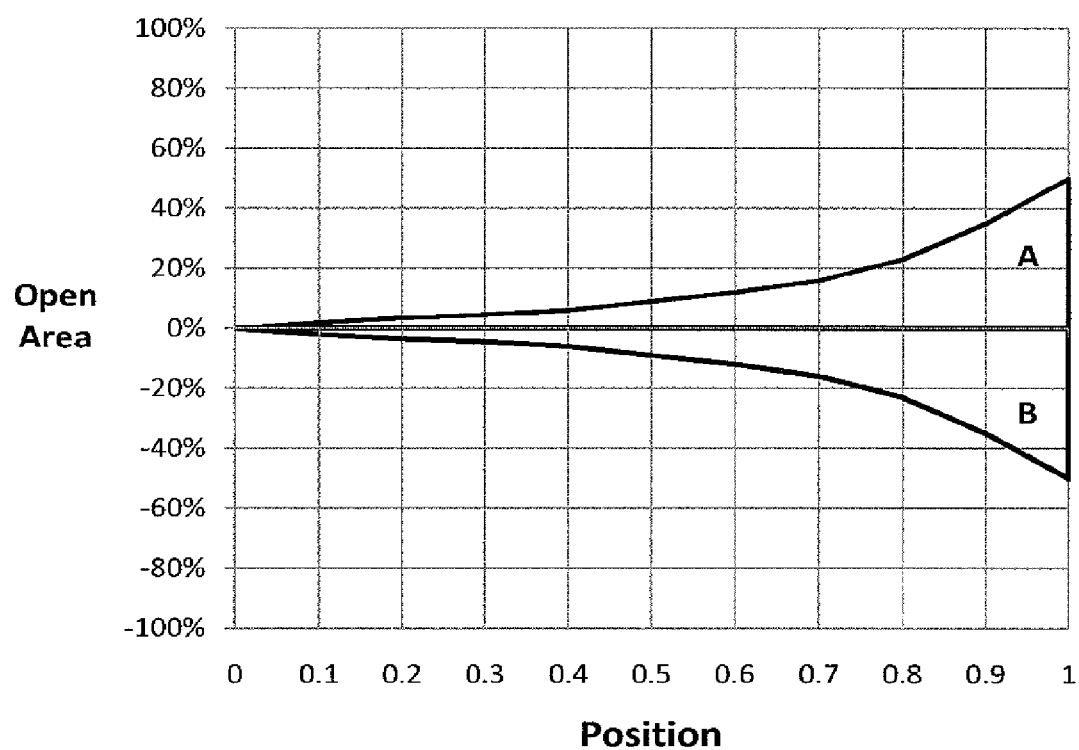
FIG. 8 is a graph showing the percentage open area of a valve aperture according to a second embodiment of the invention as a function of the valve sleeve position.

FIG. 8 is a graph showing the relative change in the open area of the valve body outlet as a function of valve sleeve position according to a second embodiment of the invention. In this case, two sides of the trilateral aperture are curved and the apex of the trilateral aperture is oriented towards the direction of rotation of the valve sleeve. As the aperture of this embodiment is symmetrical about the x axis, the open area will in this case be twice that of the portion shown above the x axis. However, as noted above, the apertures of the invention can be of numerous shapes, not necessarily symmetrical, provided that they result in the appropriate increased rate of change of open area in relation to the distance of movement of the movable member.

For example, it would be possible to provide a somewhat similar trilateral configuration in which two sides are curved, but in a different manner from each other, each preferably determinable by a polynomial equation; and the open area of the aperture at different positions would nevertheless have the increased rate of change of open area in relation to the distance of movement of the movable member. The curve of each side of the aperture in FIG. 8 follows a polynomial equation of the quartic form $y=ax^4+bx^3+cx^2+dx+e$, in which the values can be inserted as follows: $y=0.71x^4-0.41x^3+0.03x^2+0.17x+0.001$, and from which the percentage open area y for each of sides A and B can be calculated, and the total percentage ascertained for different positions, as shown in Table 2, below, which corresponds to the values for the aperture discussed in relation to Table 1, above.

TABLE 2

Valve Open Area Changing Symmetrically in Two Directions

| Valve Position | Open Area (Side A) | Open Area (Side B) | Total Open Area (Side A + Side B) |
| --- | --- | --- | --- |
| 0.0 | 0.0 | 0.0 | 0.0 |
| 0.1 | 0.35 | 0.35 | 0.7 |
| 0.2 | 1.5 | 1.5 | 3 |
| 0.3 | 3 | 3 | 6 |
| 0.4 | 5 | 5 | 10 |
| 0.5 | 8 | 8 | 16 |
| 0.6 | 12 | 12 | 24 |
| 0.7 | 17 | 17 | 34 |
| 0.8 | 24 | 24 | 48 |
| 0.9 | 34 | 34 | 69 |
| 1.0 | 50 | 50 | 100 |

Figure 9:
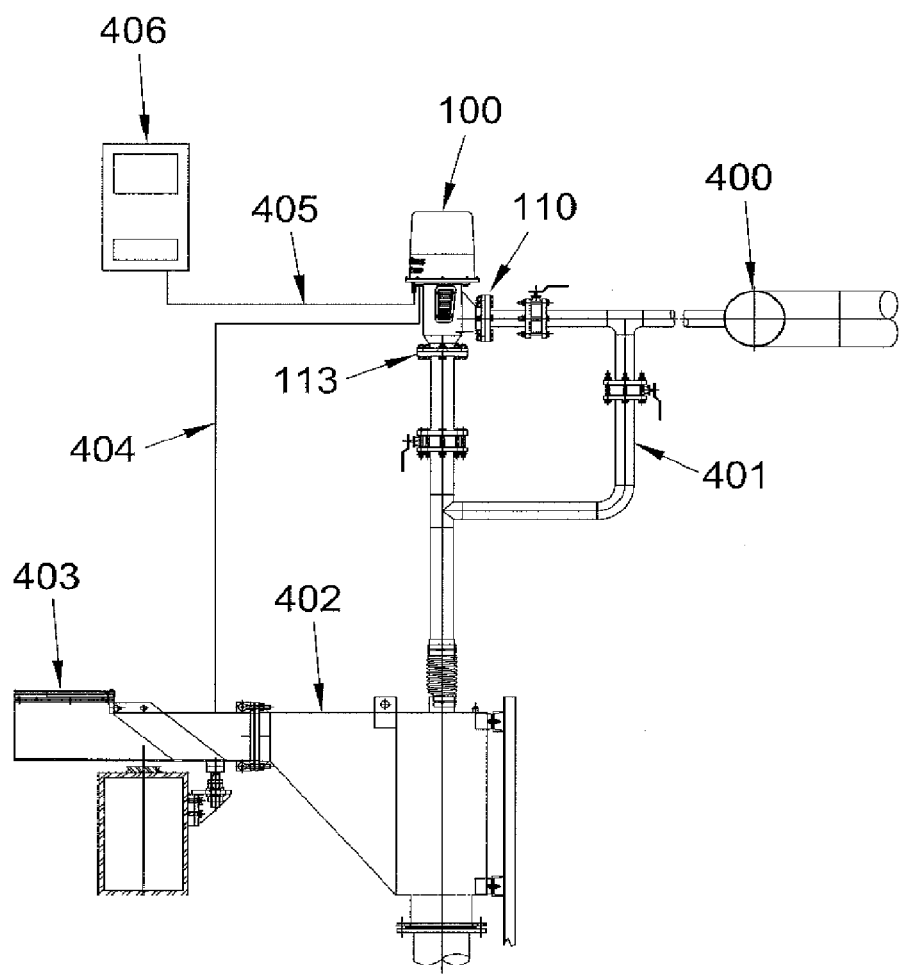
FIG. 9 is a schematic diagram showing the position of the valve of the invention in a papermaking vacuum system.

FIG. 9 shows valve 100 of the present invention as located in a typical papermaking vacuum system. In this figure, the valve 100 is operably connected by outlet flange 110 to vacuum source 400, and by inlet flange 113 to an air/water separator device 402 and thus to the papermaking drainage unit 403. Vacuum pressure information is transmitted via line 404 to a vacuum sensor in valve 100 and vacuum control information is transmitted via shielded cordset line 405 to and from controller 406, which regulates actuator 200 (FIG. 2) in the valve 100, so as to rotate sleeve 105 (FIG. 2) and adjust vacuum pressure in the system according to need. Line 401 provides a by-pass in the event that vacuum control via valve 100 is not required, or when the valve must be removed for service.

FIGS. 10 to 12 show respectively a valve 360 according to a second embodiment of the invention provided with a movable valve member such as slide member 305 (FIG. 11), and three schematic illustrations of the valve in operation. As shown in these figures, a planar valve slide member 305 replaces the rotary sleeve member used in the embodiment of FIGS. 1 to 6. As shown in the figures, valve 360 comprises a valve body 312 provided with valve outlet 317 for connection to a vacuum source and valve inlet 318 for connection to the appropriate location in the equipment (not shown) in a paper-making process. Slide member 305 is operationally secured to actuator 300 so that slide member 305 can be selectively positioned within valve body 312. Slide member 305 is provided with inlet apertures 308a and 308b configured and located so as to be operationally brought into and out of alignment with a vent 311 in valve body 312 on movement of the slide member 305 to selectively allow or restrict the passage of ambient air through the vent and into valve body 312. The slide member 305 is further provided with an outlet aperture 307 which is configured according to the invention so as to provide the required rate of change in open area and located so as to be operationally brought into and out of alignment with the valve outlet 317 and thereby connection with the vacuum source, allowing for a flow of negative pressure from the vacuum source.

Referring to FIGS. 12a to 12c, these cross-sectional figures show the progressive opening of outlet aperture 307 and corresponding closing of inlet apertures 308a and 308b as the slide member 305 is moved from a fully closed position in FIG. 12a to a fully open position in FIG. 12c. The locations of inlet apertures 308a and 308b, and outlet aperture 307, are spaced apart such that, upon sliding movement of slide member 305 to close inlet apertures 308a and 308b, and to open outlet aperture 307 to connect to the vacuum source (as shown in FIGS. 12a and 12b) the inlet apertures 308a and 308b are preferably completely closed before the opening of outlet aperture 307 commences.

FIG. 12a shows the valve body 312 of the vacuum valve 360 (see FIG. 10) with the inlet apertures 308a, 308b in the fully open, or bleed, position, and the outlet aperture 307 in the fully closed position; FIG. 12b shows the vacuum valve 360 with the outlet aperture 307 in a partially open position and the inlet apertures 308a, 308b in the fully closed position; and FIG. 12c shows the vacuum valve 360 with the outlet aperture 307 in the fully open position and the inlet apertures 308a, 308b in the fully closed position.

As shown in FIGS. 10 to 12, outlet aperture 307 is presented as a trilateral aperture having two opposed curved sides. The shape of outlet aperture 307 is designed such that the open area presented to the valve outlet 317 at each position provides the desired rate of change in open area, as discussed further above, and as exemplified in Table 2. However, the shape of outlet aperture 307 may be generally triangular, such as is shown in FIGS. 5 and 6, or it may comprise a plurality of slots, drilled holes or other suitable perforations, in each case located in relation to each other in a manner such that they present the appropriate rate of change in open area, and thus provide the advantageous linear change in vacuum pressure as a function of opening or closing the valve.

Figure 13:
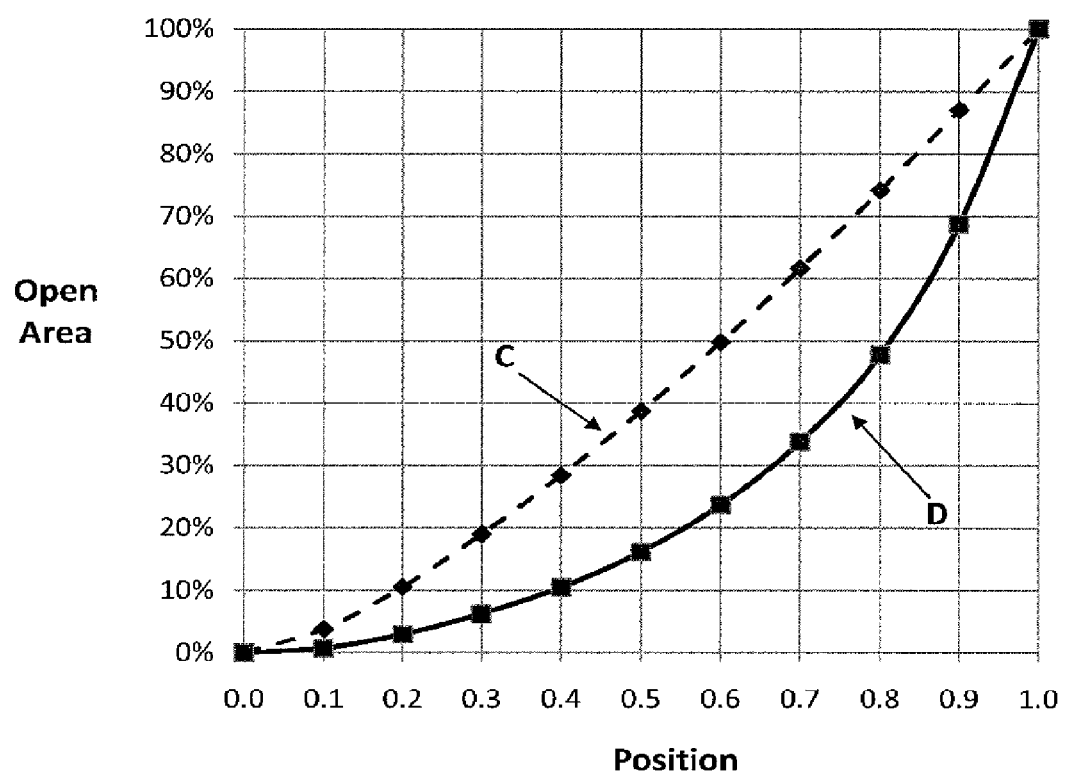
FIG. 13 is a graph showing the percentage open area of a valve of the prior art in comparison to a valve aperture in an embodiment of the invention.

FIG. 13 is a graph depicting the percentage open area of a valve according to the present invention, in comparison to a ball type prior art valve such as commonly used in a paper-making process. In FIG. 13, the percentage open area of the prior art valve is shown on the Y-axis as a function of valve position for various values along the X-axis, and identified by line C. The line identified as D provides corresponding information for a valve in an embodiment of the present invention. As can be seen from FIG. 13, the open area C of the prior art valve changes substantially linearly with respect to changes in position between fully closed and fully open, going from approximately 5% open at position 0.1, to about 10% open at position 0.2, to about 20% fully open at position 0.3, up to 90% open at position 0.9. Experimentation has shown that this generally linear change in open area in response to position change in the prior art valve C does not provide a directly proportional change in vacuum pressure, and results in significantly reduced efficiency when the valve is in a position approaching fully open.

In contrast, it can be seen from line D in FIG. 13 that starting from the closed position, the open area of the valve of the invention increases much slower than the corresponding increase in open area of the valve of the prior art (line C), continues to increase at a slower rate in the intermediate positions, but increases at a significantly higher rate when approaching the fully open position. For example, at position 0.5, the valve of the invention is only about 15% open, whereas at the same position, the prior art valve is approximately 40% open. This advantageous feature of the invention in comparison with the corresponding feature of the prior art, can further be seen from the respective numeric values shown in Table 3 below:

TABLE 3

| Position | Open Area Prior Art (%) | Open Area Invention (%) |
| --- | --- | --- |
| 0.1 | 4 | 0.7 |
| 0.2 | 11 | 3 |
| 0.3 | 19 | 6 |
| 0.4 | 29 | 10 |
| 0.5 | 39 | 16 |
| 0.6 | 50 | 24 |
| 0.7 | 62 | 34 |
| 0.8 | 74 | 48 |
| 0.9 | 87 | 69 |
| 1.0 | 100 | 100 |

As discussed above, it has been found that particularly advantageous results can be obtained if the increase in open area of the aperture in the valves of the present invention is determinable by a polynomial equation, preferably of at least the third degree.

Figure 14:
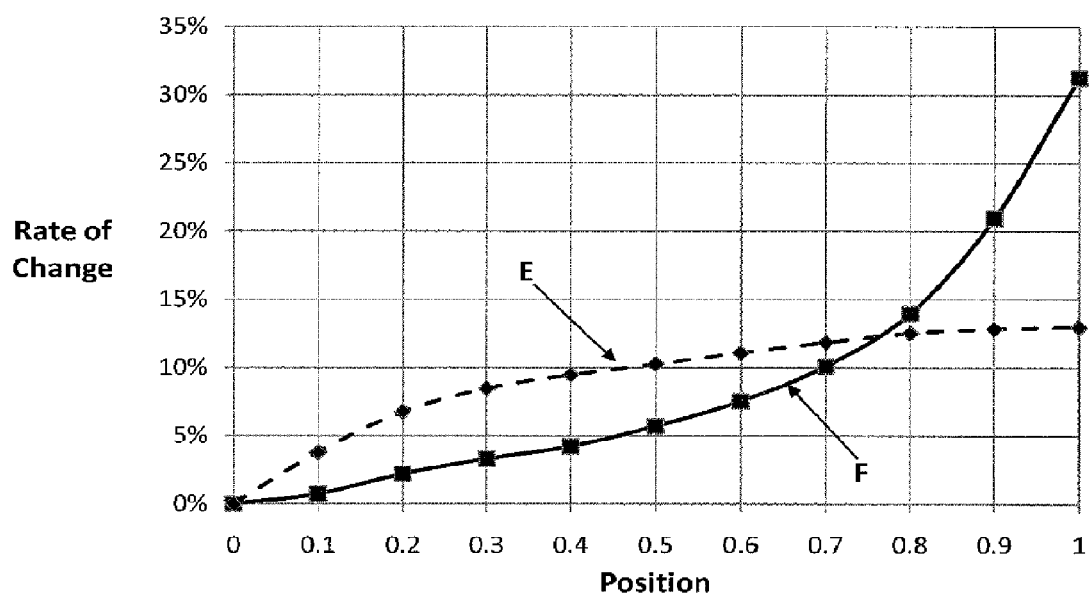
FIG. 14 is a graph showing the rate of change in open area of a valve of the prior art in comparison to a valve aperture in an embodiment of the invention.

Referring now to FIG. 14, this is a graph providing a comparison between the rate of change in open area as a function of valve position for a prior art valve, and a valve in accordance with the present invention. The prior art valve of FIG. 14 is of the same general type as the prior art valve identified by line C in FIG. 13. The rate of change in open area for the prior art valve, between the fully closed and fully open positions, is identified by line E in FIG. 14, and it can be seen that the rate of change increases significantly in the early stages starting from the fully closed position, slows significantly in the intermediate stages, and approaches a constant level in the later stages approaching the fully open position, i.e. as line E approaches the horizontal.

In contrast, the rate of change in open area for the valve of the invention, between the fully closed and fully open positions, as identified by line F in FIG. 14, increases slowly in the early stages from the fully closed position, increases steadily in the intermediate stages, and increases significantly more rapidly in the later stages approaching the fully open position, i.e. as line F approaches the vertical, thus providing the significant advantages over the prior art as discussed above.

This advantageous feature of the invention in comparison with the corresponding feature of the prior art, can further be seen from the respective numeric values shown in Table 4 below:

TABLE 4

| Position | Rate of Change Prior Art (%) | Rate of Change Invention (%) |
| --- | --- | --- |
| 0.1 | 3.8 | 0.7 |
| 0.2 | 6.8 | 2.2 |
| 0.3 | 8.5 | 3.3 |
| 0.4 | 9.5 | 4.2 |
| 0.5 | 10.3 | 5.7 |
| 0.6 | 11.0 | 7.5 |
| 0.7 | 11.8 | 10.1 |
| 0.8 | 12.5 | 14.0 |
| 0.9 | 12.8 | 21.0 |
| 1.0 | 13.0 | 31.3 |

As discussed above, it has been found that particularly advantageous results can be obtained if the increase in the rate of change in the open area of the aperture in valves of the invention open area is determinable by a polynomial equation, preferably of at least the third degree.

We claim:
1. A valve for use in a vacuum drainage system, comprising
i) a valve body having
(a) an exterior wall comprising an inlet configured to connect to papermaking equipment, and an outlet configured to connect to a vacuum source; and
(b) an interior chamber; and
(ii) a movable member movably secured within the interior chamber and having at least one outlet aperture that provides an individual operational open area for fluid flow from the interior chamber to the outlet, with a total operational open area defined as the sum of the individual open areas,
wherein:
as the movable member moves through a distance of travel expressed as x, where x ranges from x=0 at a fully closed position to x=1 at a fully open position, movement of the movable member from the closed position to the fully open position results in a linear increase in vacuum pressure provided through the valve from the vacuum source to the papermaking equipment; and
a percentage of the total operational open area, expressed as y, varies non-linearly with x, such that when:
x=0, y=0%;
x=0.1, y=0.7% (±0.07%);
x=0.2, y=3% (±0.3%);
x=0.4, y=10% (±1.0%),
x=0.5, y=16% (±1.6%),
x=0.6, y=24% (±2.4%),
x=0.7, y=34% (±3.4%),
x=0.8, y=48% (±4.8%),
x=0.9, y=69% (±6.9%), and
x=1.0, y=100%.
2. A valve according to claim 1, wherein the interior chamber comprises a substantially cylindrical interior, the movable member is a rotatable valve sleeve secured within the substantially cylindrical interior and has a substantially cylindrical outer wall, the outlet aperture is provided to the substantially cylindrical outer wall, and the movement of the valve sleeve through the distance of travel comprises rotation about an axis.
3. A valve according to claim 1, wherein the movable member is a slidable plate member.
4. A valve according to claim 1, wherein y varies with x as a polynomial equation of a third degree.
5. A valve according to claim 1, wherein y varies with x as a polynomial of a fourth degree.

6. A valve according to claim 1, comprising a single outlet aperture.

7. A valve according to claim 6, wherein the outlet aperture has a configuration which is substantially trilateral and is defined by substantially linear first and second edges and a third edge connected to and having a curvature towards each of the first and second edges.

8. A valve according to claim 7, wherein the first edge is substantially parallel to the axis and the second edge is substantially perpendicular to the first edge.

9. A valve according to claim 7, wherein the first edge and the second edge are substantially of equal length.

10. A valve according to claim 7, wherein the curvature is selected from partial parabolic, arcuate, and a curve defined by a plurality of mutually connected linear segments.

11. A valve according to claim 10, wherein the curvature is defined according to a polynomial equation of a third degree $z=gx^3+hx^2+jx+k$, where z is the curvature.

12. A valve according to claim 10, wherein the curvature is defined according to the polynomial equation of a fourth degree $z=fx^4+gx^3+hx^2+jx+k$, where z is the curvature.

13. A valve according to claim 6, wherein the outlet aperture comprises two curved sides, which are connected at an apex oriented towards a direction of movement of the movable member, and the curved sides each have a curvature selected from partial parabolic, arcuate, and a curve defined by a plurality of mutually connected linear segments.

14. A valve according to claim 13, wherein the two curved sides are symmetrical about an X-axis through the centre of the outlet aperture parallel to the direction of movement of the movable member.

15. A valve according to claim 13, wherein the curvature is defined according to a polynomial equation that is either of a third degree or of a fourth degree.

16. A valve according to claim 1, wherein the at least one outlet aperture further comprises a plurality of wall connection members defining a plurality of sub-apertures.

17. A valve according to claim 16, wherein the sub-apertures have a configuration selected from at least one of slots and perforations.

18. A valve according to claim 1, wherein the exterior wall of the valve body further comprises a vent operatively connectable to a source of ambient atmospheric air; and the movable member further comprises a movable member inlet operably alignable with the vent.

19. A valve according to claim 18, wherein the movable member is selected from a slidable plate member for which the movable member inlet has a quadrilateral configuration, and a rotatable sleeve for which the movable member inlet has a trapezoidal configuration, wherein two parallel sides are oriented substantially parallel to the direction of rotation of the movable member.

* * * * *